(12) United States Patent
Hansen

(10) Patent No.: US 10,966,002 B2
(45) Date of Patent: Mar. 30, 2021

(54) SYSTEM, METHOD, AND COMPUTER PROGRAM PRODUCT FOR WAKE UP OF A WATER METER

(71) Applicant: SENSUS SPECTRUM, LLC, Raleigh, NC (US)

(72) Inventor: Adam D. Hansen, Cary, NC (US)

(73) Assignee: SENSUS SPECTRUM, LLC, Raleigh, NC (US)

( * ) Notice: Subject to any disclaimer, the term of this patent is extended or adjusted under 35 U.S.C. 154(b) by 0 days.

(21) Appl. No.: 16/111,592

(22) Filed: Aug. 24, 2018

(65) Prior Publication Data

US 2020/0068276 A1 Feb. 27, 2020

(51) Int. Cl.
*H04Q 9/00* (2006.01)
*G01F 15/06* (2006.01)
*G08B 21/18* (2006.01)
*G01M 3/26* (2006.01)

(52) U.S. Cl.
CPC ............. *H04Q 9/00* (2013.01); *G01F 15/063* (2013.01); *G08B 21/182* (2013.01); *G01M 3/26* (2013.01); *H04Q 2209/60* (2013.01)

(58) Field of Classification Search
CPC .... H04Q 9/00; H04Q 2209/60; G01F 15/063; G08B 21/182; G01M 3/26
See application file for complete search history.

(56) References Cited

U.S. PATENT DOCUMENTS

| | | | |
|---|---|---|---|
| 6,710,721 B1 | 3/2004 | Holowick | |
| 7,221,286 B2 | 5/2007 | Gould et al. | |
| 7,446,672 B2 | 11/2008 | Johnson et al. | |
| 8,006,569 B2 | 8/2011 | Gogge et al. | |
| 2003/0048199 A1* | 3/2003 | Zigdon | H04B 1/662 340/870.02 |
| 2005/0053047 A1* | 3/2005 | Osterloh | H04Q 9/00 370/344 |
| 2006/0227006 A1* | 10/2006 | Gould | G01D 4/006 340/870.02 |

(Continued)

FOREIGN PATENT DOCUMENTS

WO   WO2018050967 A1   3/2018

OTHER PUBLICATIONS

International Search Report and Written Opinion for corresponding PCT/US19/47603 dated Dec. 20, 2019.

*Primary Examiner* — Amine Benlagsir
(74) *Attorney, Agent, or Firm* — Olive Law Group PLLC; Ronald A. Rudder

(57) ABSTRACT

A system (with corresponding method and computer program product) for monitoring flow conditions for a utility provider. The system has a register having a processor capable of monitoring a flow of fluid flowing through a utility line and a communication device having a) a wake-up circuit in communication with the register via at least one communication port and b) a processor programmed and configured to communicate with the register and broadcast information from the communication device. The processor of the register is programmed and configured to supply a signal on the communication port whenever the register has communication data for broadcast to the utility provider. The wake-up circuit of the communication device checks the communication port to ascertain if the signal is present.

22 Claims, 7 Drawing Sheets

(56) References Cited

U.S. PATENT DOCUMENTS

| | | | |
|---|---|---|---|
| 2007/0284293 A1 | 12/2007 | Pitchford et al. | |
| 2009/0198458 A1* | 8/2009 | McDermid | G01F 23/266 |
| | | | 702/55 |
| 2010/0207784 A1* | 8/2010 | Bragg | H04W 52/0229 |
| | | | 340/870.03 |
| 2011/0066297 A1 | 3/2011 | Saberi et al. | |
| 2013/0085688 A1 | 4/2013 | Miller et al. | |
| 2013/0106616 A1* | 5/2013 | Gustafsson | H04Q 9/00 |
| | | | 340/870.02 |
| 2014/0183386 A1* | 7/2014 | Ravid | G01F 1/115 |
| | | | 251/129.01 |
| 2015/0013772 A1* | 1/2015 | Patel | F16K 31/12 |
| | | | 137/1 |
| 2016/0216141 A1 | 7/2016 | Leaders et al. | |
| 2017/0306608 A1 | 10/2017 | Goldberg et al. | |
| 2017/0307464 A1* | 10/2017 | Hasselbeck | G01M 3/24 |
| 2018/0224349 A1* | 8/2018 | Fleury, Jr. | E03B 7/003 |

* cited by examiner

SYSTEM, METHOD, AND COMPUTER PROGRAM PRODUCT FOR WAKE UP OF A WATER METER

BACKGROUND OF THE INVENTION

Field of the Invention

The present invention relates to a system and method for controlling communication to and from a water meter.

Description of the Related Art

Utilities provide electric, gas, and water service to users and determine charges and billings to their customers. Monthly usage is often determined by reading a consumption meter (usually located at the point where the utility service line enters the customer's house, store or plant) over the interval of billing and calculating (or estimating) the quantity of consumable used such as the kilowatts of electricity, cubic feet of natural gas, or the gallons of water consumed during a billing period. In the field of water meters, water meters typically include a register which totalizes the flow of water, and thereby determines the quantity of water consumed over the billing interval. The register is read periodically and the difference between the present and the prior reading determines the amount of utility water used. For example, if the most recent water meter reading was 2 million gallons or liters and the previous water meter reading was 1.8 million liters, then 200,000 liters of water were consumed.

One method that has been used in the past for obtaining the consumption amount had a person (i.e., a meter reader) in the field equipped with a hand-held unit. The meter reader would visually read the dial of the meter and enter the meter reading into the hand held. Alternatively, the meter reader in local proximity to the meter would obtains the readings via a remote (typically radio) communication broadcast from the meter. To assist in remote communication of data from the meters, utility providers have employed a device commonly referred to as a Meter Interface Unit, or MIU. The MIUs had transceivers which received a "wake up" polling signal or a request for their meter information from a transceiver mounted in a passing vehicle or carried by the meter reader, known as a mobile data collection unit ("MDCU"). As explained in U.S. Pat. No. 6,710,721, the entire contents of which are incorporated herein by reference, the MIU then responsively broadcasted the meter number, the meter reading, and other information to the MDCU. After obtaining all the meter information required, the meter reader attached the MDCU to a modem line or otherwise connected it to a utility's computer system to convey the meter information to a central billing location.

The '721 patent also described specifically a water meter with an optical sensor adapted to be positioned proximate a water meter face which indicated a consumed amount of water. The optical sensor sensed the position of a needle on the water meter face via infrared (IR) sensing electronics, and provided the sensed position of needle via communication link to an optical sensor interface. The sensed position of needle was provided as a data signal comprising an analog voltage transmitted to an analog to digital (ADC) of a controller.

More recent meter reader devices have utilized more sophisticated ways to read and store the quantity of the consumable used, as discussed below.

U.S. Pat. No. 8,006,569, the entire contents of which are incorporated herein by reference, describes a magnetic flow meter. A magnetic flow meter typically includes flow tube incorporating a magnetic transducer having a pair of electrodes disposed across a diameter of the pipe carrying the fluid, with at least part of one surface of each electrode in intimate contact with the fluid in the pipe. Magnetic pole pieces are disposed across the orthogonal diameter of the pipe and linked by a magnetic circuit. The magnetic field imparts a Lorentz force on charged species moving with a bulk medium (ions in the case of water), causing the charged species to migrate in a direction orthogonal to both the magnetic field and the direction of bulk fluid motion. The mutual displacement of oppositely charged species results in an electric field developing along the direction of migration which builds up until the electrostatic force on a given ion is balanced by the magnetic force. Since the magnetic force depends implicitly on the bulk medium flow velocity, measurement of the opposing electric field (or potential difference) provides a convenient way for determining the flow rate, while integration over time allows the total volume that has passed through the tube to be calculated U.S. Pat. No. 7,221,286, the entire contents of which are incorporated herein by reference, addressed the need to have a system and apparatus that would allow an electronic meter register that was connected to an automatic meter reading (AMR) communication device to be read locally without requiring any additional conductive connections. The '286 patent detailed AMR units in communication with a meter register having a sensor to detect the rotational movement of components within the meter to generate an electronic count of the volume of commodity that flows through the meter. The recorded data from the meter was broadcast by a communication device of the AMR unit using an RF signal. In such types of systems, the meter measurement was broadcast from the communication device using an RF signal that can be read from a remote location. The antenna of such communication devices typically extended slightly above a pit lid such that the radio frequency signals generated by the antenna could be transmitted away from the meter pit. In many situations, the pit lid is formed from a metallic material, such as iron, that would significantly inhibit the transmission of radio frequency signals therethrough.

The 286 patent also described that many utilities had expressed a desire for the ability to make manual, localized meter readings in addition to the readings transmitted by the communication device. Such manual readings were typically done utilizing a meter reading system, such as the TouchRead® system, including a hand-held meter reading device, such as the AutoGun™ hand-held device, both available from Sensus Metering. The TouchRead® system allows service personnel to place the hand-held interrogating device near an external reading module that typically extends through a pit lid or is accessible along the exterior of a consumer's home. The hand-held interrogating device was inductively coupled to the reading module such that information from the meter register connected to the reading module could be read by the hand-held device.

The '286 patent described a coupling arrangement between a communication device used to wirelessly transmit accumulated data from a utility meter and a separate, spaced reading module such that the accumulated data from the utility meter can be obtained locally by an interrogating device from the reading module. The signal coupling between the communication device and the reading module was completed without any conductive connections and utilized an inductive coupling between a pair of inductive coils.

The communication device of the '286 patent was positioned at a location remote from the electronic meter register. Typically, the communication device of the '286 patent was suspended beneath the pit lid that covered a pit enclosing the utility meter including the electronic meter register. The communication device included electronic circuitry, an internal power supply and an antenna within an environmentally protected inner enclosure. The sealed enclosure of the communication device enclosed a programming coil that was positioned behind a programming port formed as a portion of the communication device. The programming coil positioned behind the outer wall of the inner enclosure was electrically coupled to the electronic circuitry of the communication device. The programming coil was used to transfer data and programming commands to and from the electronic circuitry contained within the communication device, such as for modifying the operating program of the electronic circuitry or to extract stored information, such as the accumulated data from the utility meter. The programming coil of the '286 patent could be accessed directly by a hand-held interrogating device such that the meter data and programming instructions can be transferred to and from the communication device.

These more recent meter reader devices, while addressing specific needs in the industry, have placed more burden on the batteries in the meter reading devices.

SUMMARY OF THE INVENTION

In one embodiment, there is provided a system for monitoring fluid flow for a utility provider. The system has a register having a processor capable of monitoring a flow of fluid flowing through a utility line and a communication device having a) a wake-up circuit in communication with the register via at least one communication port and b) a processor programmed and configured to communicate with the register and broadcast information from the communication device The processor of the register is programmed and configured to supply a voltage signal on the communication port whenever the register has communication data for broadcast to the utility provider. The wake-up circuit of the communication device checks the communication port to ascertain if the voltage signal is present.

In one embodiment, there is provided a computerized method for monitoring fluid flow for a utility provider. The method comprises monitoring a flow of a fluid flowing through a utility line, and generating an alarm if the flow is abnormal. The method comprises supplying a signal from a register monitoring the flow onto a communication port connecting between the register and a communication device whenever the register has information to be broadcast to a utility provider. The method comprises the communication device checking the communication port to ascertain if the voltage signal is present.

In one embodiment, there is provided a computer program product for monitoring fluid flow for a utility provider which implements the computerized method described above.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

Utilities in general are concerned about correctly and reliably reading a utility consumption for a long duration after the meter reader has been installed.

One illustrative system and method for monitoring fluid flow for a utility provider is described below with a utility meter similar to the utility meter in the '286 patent (described above}. The utility meter of the present invention in one embodiment has an electronic register 26 coupled to a communication device 34 (e.g., a radio transceiver or other broadcasting device). The electronic register 26 typically measures or totalizes a volume of the commodity provided by the utility provider, although the flowrate is conventionally measured in order to ascertain the volume. To conserve power, a wake-up circuit 50 is included. For the sake of simplicity, the wake-up circuit 50 is shown separately, but could be built into the communication device 34 and/or the register 26. In one embodiment of the present invention, one or more processors contained in the communication device 34 and/or the register 26 monitor communication via line 30 to see if a voltage signal is present indicating that there is information in the register 26 to be communicated (i.e., transmitted or broadcast) from the communication device 34 to a utility provider or others outside the utility meter.

Figure 1:
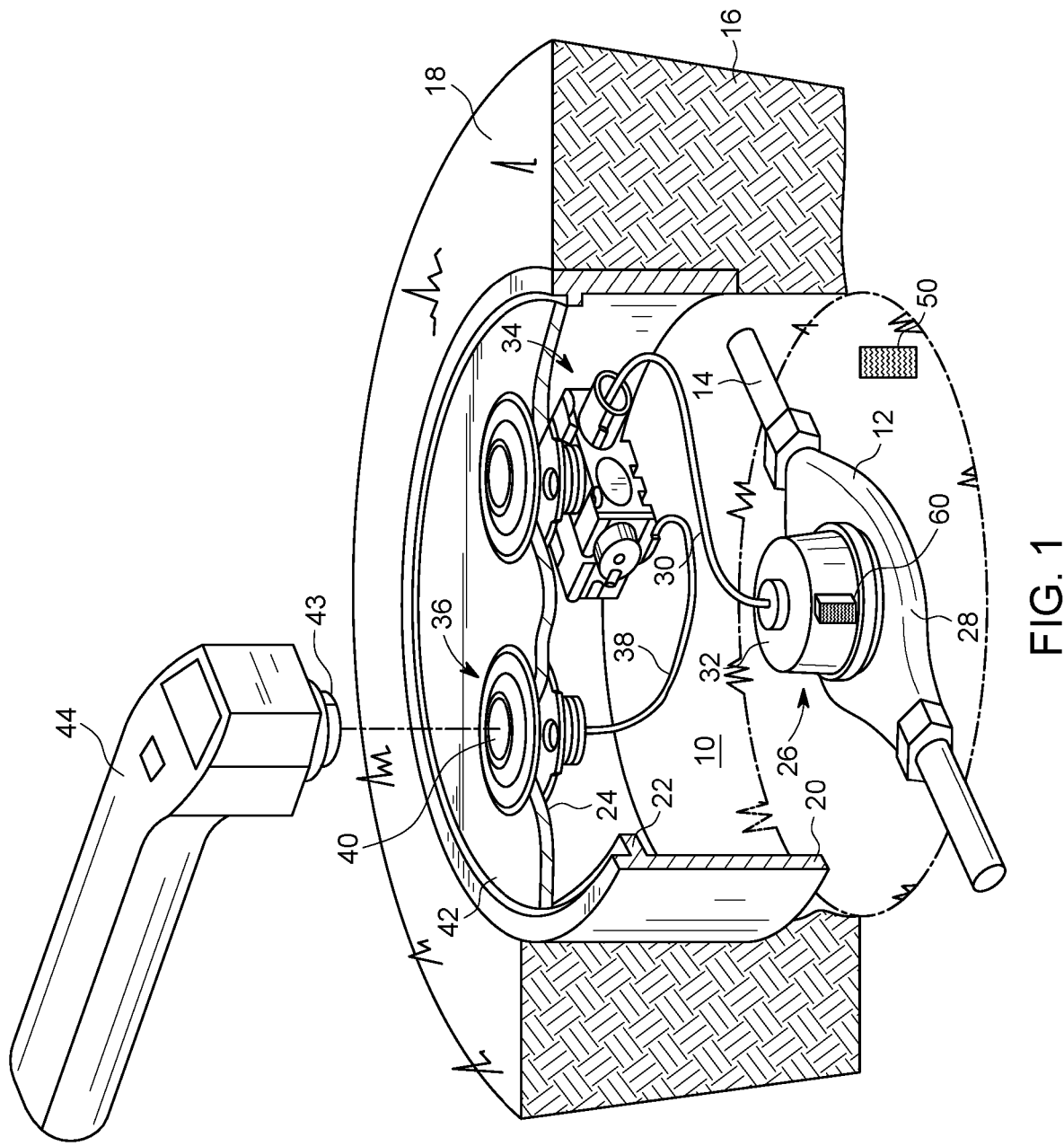
FIG. 1 is a schematic according to one embodiment of the invention of a meter pit including a utility meter which is positioned in a fluid supply line.

More specifically, as depicted by the example in FIG. 1, meter pit 10 includes a utility meter 12 which is positioned in a fluid supply line 14. The fluid supply line is typically buried within the ground 16 and extends through the meter pit 10. Although the utility meter 12 will be described below as being a water meter, it should be understood that the utility meter could be any of a variety of different types of meters for measuring different types of consumable commodities, such as gas, water, electricity or any other type of commodity. The present invention is not limited to the location of the elements shown in FIG. 1 actually residing in a pit. For example, the utility meter could be in a basement of a house or otherwise inside a commercial or residential structure and connected via wire to a communication device such as a radio transceiver on the outside of the house or structure.

As illustrated in FIG. 1, the meter pit 10 extends below the ground surface 18 and is defined by a pit box 20. The pit box 20 is typically a cylindrical, metal enclosure that is submerged in the ground 16. The pit box 20 includes an upper ledge 22 that supports a pit lid 24. The pit lit 24 is typically formed from a metallic material, such as cast iron, although other lids and lid materials can be used to encloses the meter pit 10.

Utility meter 12 includes register 26 that is mounted to the meter body 28. The register 26 is typically an electronic meter register that includes internal circuitry (including a processor) that monitors the rotational movement of components contained within the meter body 28. The register 26 can detect the rotational movement of components within the meter body 28 (or as in the '569 patent described above detect flow based on a magnetically induced voltage indicative of the instantaneous flow) and generate an electronic count of the volume of commodity that flows through the meter 12. The register 26 can record the volumetric flow information received from the meter body 28. One example of an electronic meter register is the Sensus ICE meter register.

As further illustrated in FIG. 1, the register 26 includes at least one communication line 30 for data transfer between the meter register 26 and the communication device 34. As shown, communication line 30 extends through the wall 32 of the register 26. In some configurations, multiple wires can be used for internal communications between the register 26 and communication device 34. The register 26 and the communication line 30 can be composed with commercial components such as the Sensus RadioRead® meter transceiver unit (MXU).

As shown in FIG. 1, optionally, reading module 36 is coupled to the communication device 34 by a communication wire 38. The reading module 36 includes an upper contact surface 40 positioned above the top surface 42 of the pit lid 24. The contact surface 40 is thus accessible by a probe 43 of an interrogation device 44. The interrogation device 44 can be a hand-held unit, such as the AutoGun™ available from Sensus Metering, which allows accumulated data from the meter 12 to be read locally. As can be understood in FIG. 1, the contact surface 40 of the reading module 36 extends above the pit lid 24 such that the contact surface 40 can be accessed without removing the pit lid 24. Further, programming information can be transmitted from the interrogation device 44 to the communication device 34 through the interconnection between the reading module 36 and the communication device 34.

In one embodiment, radio transceiver or communication device 34 includes internal circuitry (including one or more processors) which receives accumulated data from the register 26 that relates to the volume of the commodity flowing through the meter. The internal circuitry extracts and stores the relevant consumption data and broadcasts a signal by radio frequency for reception and reading at a remote location. The communication device 34 is typically supported beneath the pit lid 24 and electronically coupled to the electronic meter register 32 through the communication line 30.

Figure 2:
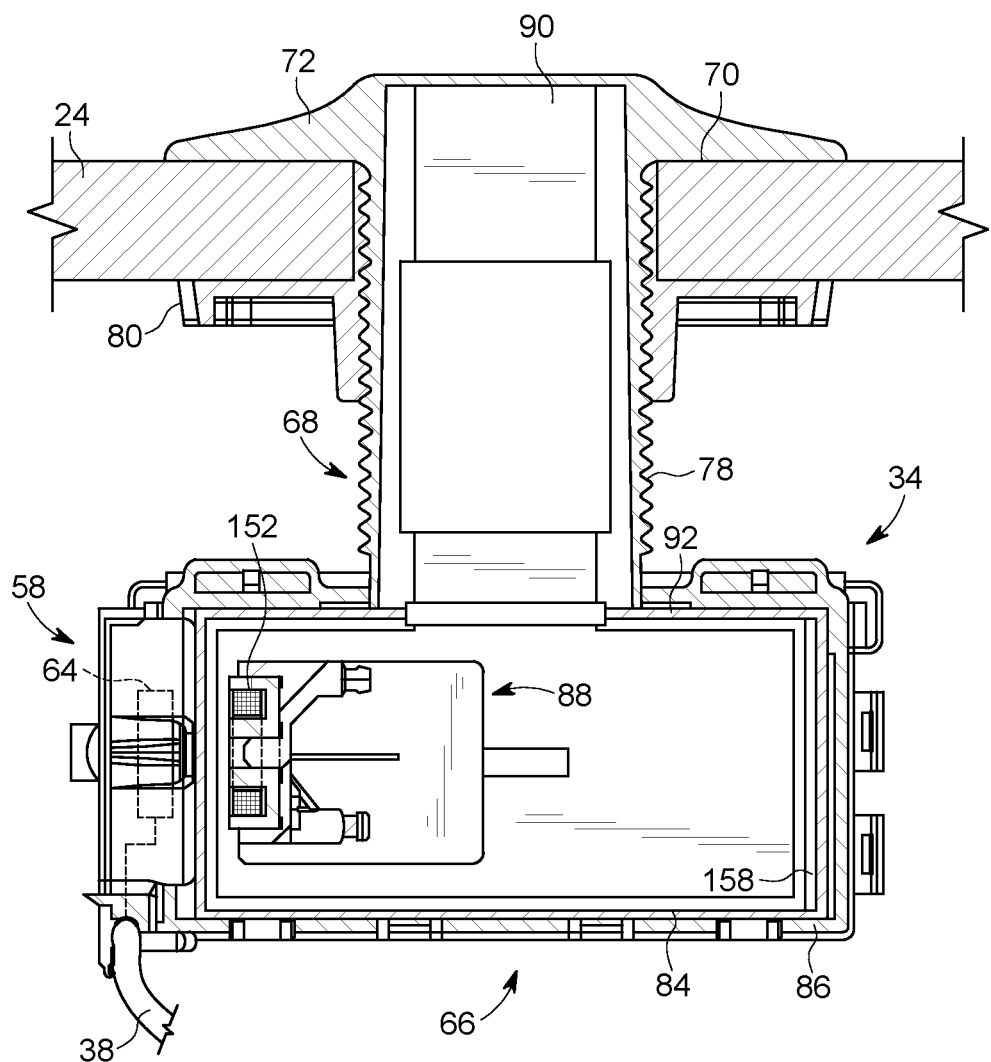
FIG. 2 is a schematic according to one embodiment of the invention showing a detailed configuration of a meter pit transceiver.

As seen in FIG. 2, the pit-mounted communication device 34 includes an upper housing 68 that extends through an opening 70 formed in the pit lid 24. Specifically, the upper housing 68 includes a mushroom shaped top cap 72 having an outer diameter greater than the diameter of the opening 70. The present invention is not limited to pit-mounted systems and can apply to above ground for example residential or commercial utility meters. A bottom surface 74 of the top cap 72 contacts the top surface 76 of the pit lid 24. The upper housing 68 includes an externally threaded body 78 that extends through the opening 70 and is securely attached to the main enclosure body 66. A locking nut 80 is threadedly received along the body 78 and is tightened into contact with the bottom surface 82 of the pit lid 24. The threaded movement of the locking nut 80 into contact with the bottom surface 82 prevents the upper housing 68 from being removed from the opening 70.

Enclosure body 66 generally includes a sealed inner enclosure 84 that is surrounded by an outer shell or boot 86. The inner enclosure 84 is a general rectangular member that completely encloses electronic circuitry 88 of communication device 34. The inner enclosure 84 includes an opening that allows an antenna 90 to be connected to the electronic circuitry 88. The antenna 90 is encapsulated in a protective block that rests on the top wall 92 of the inner enclosure 84. Electronic circuitry 88 includes a programming coil 152 that is generally aligned with a programming port formed as part of the communication device. The programming coil 152 is positioned behind a side wall 158 of the inner enclosure 84 and is generally aligned with the transfer coil 64 when the connector module 58 is received within the programming port. In this manner, signals and data from the communication device 34 can be inductively transmitted from the programming coil 152 to the transfer coil 64. Likewise, programming information from the transfer coil 64 can be inductively transferred to the programming coil 152. The inductive coupling between the programming coil 152 and the transfer coil 64 allows electronic signals to be transferred bi-directionally between the communication device 34 and the reading module 36.

Returning to FIG. 1, at least one battery 60 is provided to power the instrumentation (such as register 26 and/or communication device 34). Other type of "self-powering" could be used such a capacitive power storage, solar power for remote installations, and RF charging systems could be used to power some or all of the electrical components. In some cases, power may be derived from the fluid flow in the utility line being monitored. While shown for the sake of simplicity as one free-standing battery, the battery or batteries 60 are typically included inside their respective components such as communication device 34 and register 26. The capability for a utility to correctly read utility consumption reliably for a long duration after the meter reader has been installed depends on the lifetime of battery 60 or batteries 60.

The water meter unit discussed above can be provided with an internal battery powering the microcontroller and other circuitry (processors) contained therein. In the '721 patent, a low power oscillator operating at about 32 kHz generated a 4 Hz logic interrupt signal to controller, which controlled the speed of controller. The water meter unit in the '721 patent periodically transmitted a modulated formatted data signal on an RF link that was tuned at 916.5 MHz with on-off-keyed data at 9600 bits per second (9600 baud). The transmitter transmitted the data in formatted packets or messages. By providing only a 4 Hz interrupt signal, the microcontroller in the '721 patent operated at a slow speed, and consumed only a small amount of power allowing the '721 water meter unit to operate at up to about 10 years without requiring replacement of lithium battery.

However, a lifetime of 10 years is insufficient in today's business climate. Moreover, the power associated with the exchange of information between components inside the water meters is one of the primary sources of power consumption on the battery. Conventionally, battery lifetime has been extended by increasing the polling time between the water meter waking up and providing information to the utilities on the status of the supply of gas or water flow.

Currently, a wired interface (such as communication line 30) exists between water meter register 26 and communication device 34, such as a SmartPoint® manufactured by Sensus, including a radio unit. Both the water meter register 26 and the communication device 34 including the radio unit can be self-powered (e.g. battery-powered), and typically spend the vast majority of their time sleeping. The SmartPoint® radio is typically programmed to wake up once an hour, generate a signal which wakes up the meter/register, and then receive the data from the meter/register. At that time, the SmartPoint® radio learns of an alarm condition from the meter/register 26 and can take action to contact a utility provider.

However, without the ability to transmit alarm conditions from the meter/register to the SmartPoint® radio at any time, these alarms can remain unseen for up to an hour until the SmartPoint® radio next reads the meter/register.

The invention pertains to a system and method which for a utility provider can more actively monitor flow conditions than possible in prior systems and provide the more active monitoring without significant power loss to the batteries operating the components in the utility meter. The invention in various embodiments includes a system (and corresponding method) by which a self-powered meter/register wakes up the radio unit (such as the SmartPoint® radio) by supplying a voltage signal or an optical signal on a communication line (wire or fiber optic) to the radio unit to convey critical time-sensitive data. This allows for time-critical or time-sensitive data (such as alarms) to be pushed across the network quickly to a utility provider for example, or others outside the utility meter.

This more rapid response to alarm conditions can be accomplished in a number of non-limiting ways.

Firmware in new or existing meter/registers would be programmed to allow the meter/register to drive the existing line whenever the meter/register had critical data. The radio firmware would be upgraded so it periodically "sniffed" the interface line without driving to see if the meter/register was trying to communicate. The timing of this periodic event in one embodiment would be structured such that the radio would be sniffed or polled every 't' seconds while the register would need to drive the line for at least 't' seconds to ensure it was heard. In one embodiment, the time 't' is between 5 and 15 seconds. This modification to the radio firmware would reduce the maximum latency of alarms from 1 hour to 15 seconds. In another embodiment, the time 't' is between 1 and 30 seconds. This modification to the radio firmware would reduce the maximum latency of alarms from 1 hour to 30 seconds. In another embodiment, the time 't' is between 1 and 60 seconds. This modification to the radio firmware would reduce the maximum latency of alarms for example from 1 hour to 60 seconds. Other sniffing (or polling) times 't' could be used, with the above examples being merely exemplary.

Another way to accomplish a more rapid response to alarm conditions would be to modify the radio hardware such that radio (for example the SmartPoint® radio) is always or continuously run a low-power receiver on the interface line. In this embodiment, the meter/register would drive the line for a much shorter time than described in the embodiment above (e.g, less than 1, 2, 5, 10, 20, 50, 100, and 500 milliseconds and less than other times in between), and the radio would immediately wake up upon an alarm condition. This would reduce the latency and would require less current and less power drain especially from the battery of the more inaccessible water meter/register because the register will not need to generate a signal as long as in conventional units, where the register is woke up at the polling rates.

In either of the above cases, once the radio unit detected that the interface line between the meter/register and the radio unit was being driven, the radio unit would wake up and, once the interface line was no longer being driven, would send a query to the meter/register for transfer of data.

In one embodiment of the invention, the wake-up circuit is a low-power wake-up circuit. A wake detector is simply a circuit which wakes up a microcontroller from a sleep state, saving power while anticipating an event which must be processed. Substantial power can be saved by allowing the microcontroller to sleep while waiting for a transmission to be sent. In one embodiment of the invention, a wakeup circuit would only interrupt a microcontroller from its sleep state when a voltage signal was detected on the interface line.

Figure 3A:
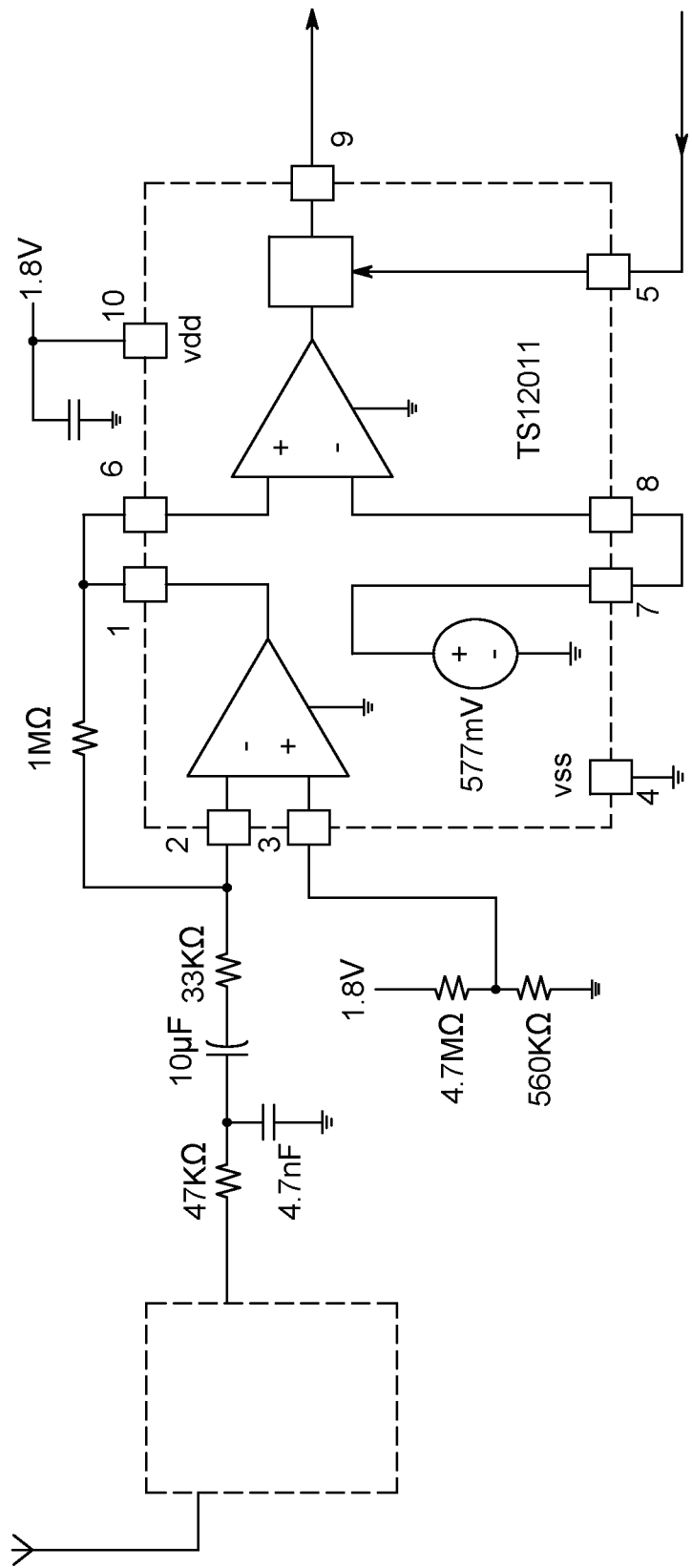
FIG. 3A is a schematic illustrating a wake-up circuit according to one embodiment of the invention.

FIG. 3A shows a circuit having a single-transistor OOK (on-off-keyed) receiver of an exemplary wake-up circuit, tuned in this case for 315 MHz, but useable at other frequencies for wake-up of a microcontroller in the register/meter or in the radio unit. The receiver in FIG. 3A produces a small drop in DC voltage across its output stage when RF is detected on line 30 (the wired interface existing between water meter/register 26 and communication device 34). Input, output, and/or monitoring pins 1-10 are shown. The microcontroller in the meter/register and/or the radio unit would take this signal, amplify the signal using an inverting gain configuration for the op amp, provide threshold detection using the comparator and reference, and deliver a logic signal to the microcontroller to indicate the RF signal had been detected as part of signal to wake-up. Otherwise, the microcontroller(s) would be asleep in a low power state until its sleep state is interrupted by this logic signal or until some other pre-programmed/pre-timed event is initiated such as the reading and storage of a totalized flow rate. One feature of the circuit in FIG. 3A is the "latch enable" pin. A high level on this pin latches and holds a comparator's output high, giving the microcontroller a clean indication that a signal has been detected for wake-up. The microcontroller(s) can clear this state by momentarily pulsing the latch enable pin low.

Figure 3B:
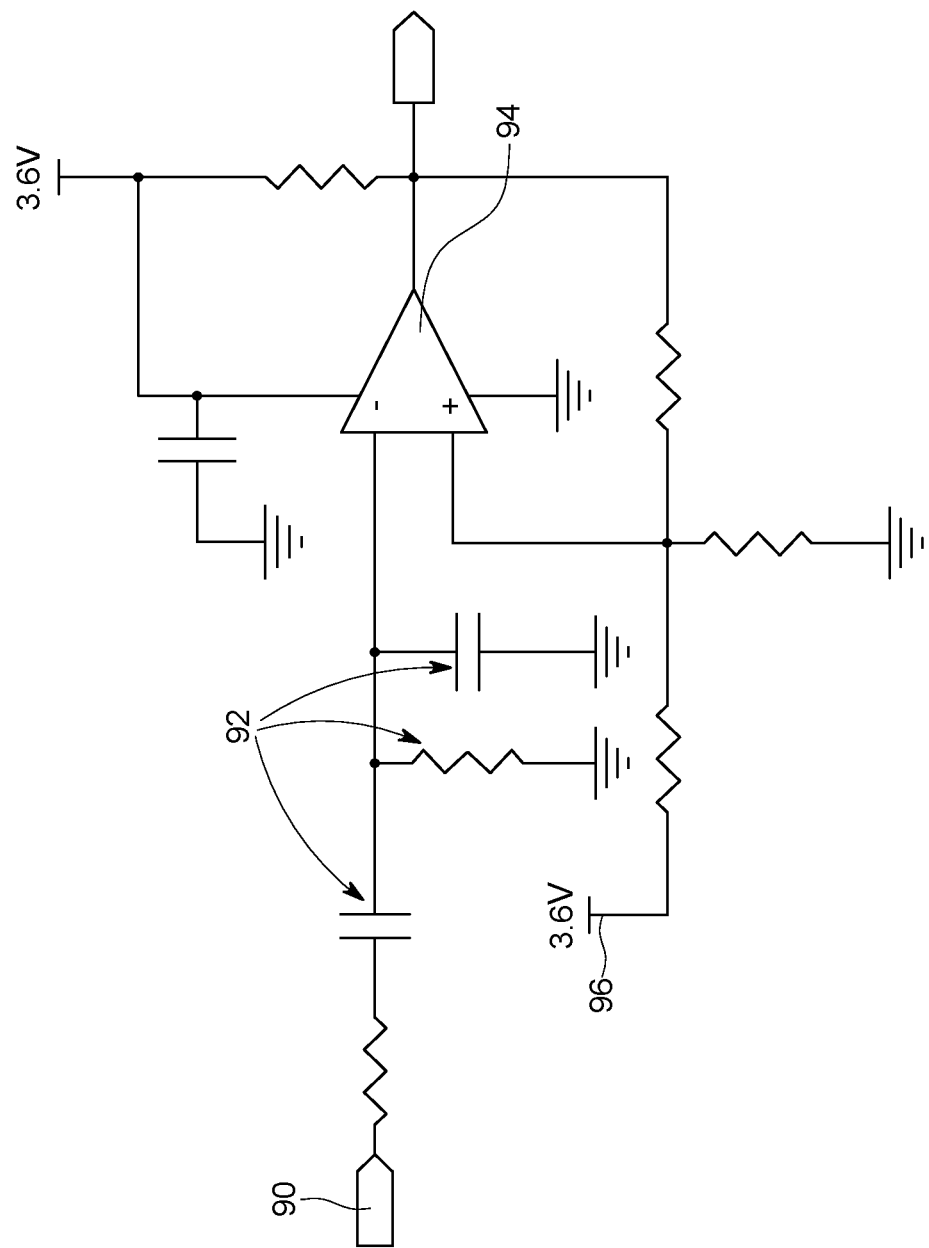
FIG. 3B is a schematic illustrating a wake-up circuit according to another embodiment of the invention.

FIG. 3B is a schematic illustrating another suitable wake-up circuit of the invention. In FIG. 3B, input 90 from the communication line (e.g., from line 30, which for example is the wired interface existing between water meter/register 26 and communication device 34 in FIG. 1) is filtered (e.g., with the filter components 92) to provide a better voltage signal. This signal is conditioned using a comparator 94 which provides threshold detection through comparison to reference voltage 96 to deliver a logic signal to the microcontroller to indicate the voltage signal had been detected. The microcontroller(s) is asleep in a low power state until its sleep state is interrupted by this logic signal or until some other pre-programmed/pre-timed event is initiated such as the reading and storage of a totalized flow rate.

Figure 4:
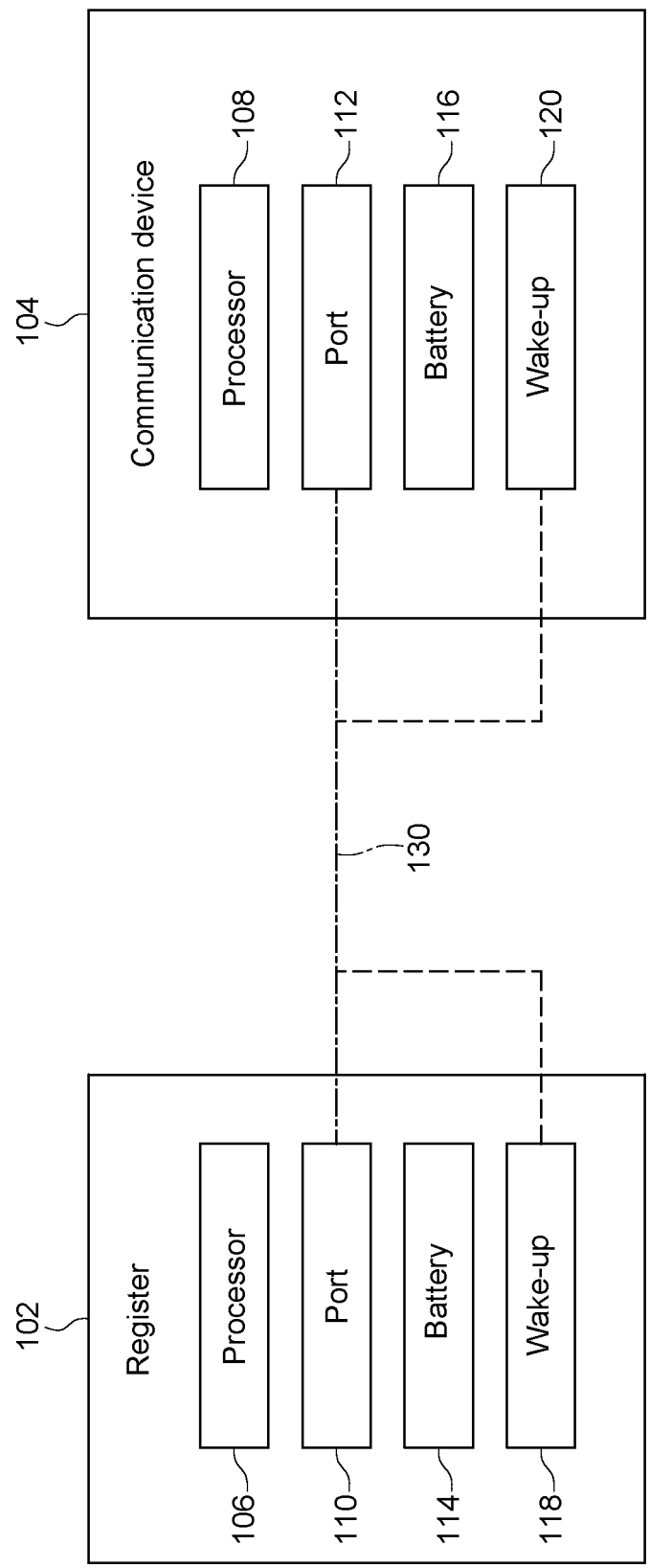
FIG. 4 is a schematic depicting, according to one embodiment of the invention, a self-powered register and a self-powered communication device.

FIG. 4 is a schematic diagram illustrating many of the embodiments of the invention. In FIG. 4, there is shown the inventive system, in one embodiment, having a self-powered register 102 comprising processor 106 capable of monitoring a flow of a fluid flowing through a utility line (not shown here but similar to fluid line 14 in FIG. 1) over set periods of time. Register 102 has a long-lifetime battery 114 having a lifetime greater than 10 years and preferably greater than 15 years, and more preferably greater than 20 years. The duration of the battery lifetime is dependent on the nominal current draw from the battery and the aging of the electrolytes over time. Battery lifetimes realistically (even with low current draw) will be less than 30 years. In the inventive system, battery 114 is connected to and powers register 102, the processor 106, the wakeup circuit 118, and/or any circuitry of port 110.

Additionally, the inventive system has a self-powered communication device 104 (such as the above noted SmartPoint® radio) in communication with register 102 via at least one communication port 112 connected to communication port 110 of register 102 by communication line 130. The self-powered communication device 104 has processor 108 programmed and configured to communicate with register 102 and broadcast information from the communication device 104. The communication device 104 also has a long-lifetime battery 116 having a lifetime greater than 10 years and preferably greater than 15 years, and more preferably greater than 20 years. Battery 116 is connected to and powers the communication device 104, the processor 108 and/or any circuitry of port 110.

In one embodiment of the inventive system, battery 114 of the register 102 is sealed in a housing of the register 102 and is not replaceable (or accessible). In one embodiment of the inventive system, processor 106 of the register 102 is programmed and configured to supply and possibly maintain for some duration a voltage signal on the communication port 110 whenever the register 102 has communication data for the communication device 104 for broadcast to a utility provider.

In one embodiment of the inventive system, communication device 104 via programming of processor 108 periodically checks the communication port 112 to ascertain if a voltage signal is present on communication line 130. This periodic checking can be done without necessarily polling processor 106 of the register to send over communication or information data. In this embodiment, the communication device 104 can periodically check every 1 to 15 seconds (or 1 to 30 seconds or 1 to 60 sec, or other programmed intervals) to ascertain if the voltage signal is present. In this embodiment, the communication device turns on when the voltage signal is present, and then once the voltage signal is no longer present, polls the register processor 102 to send over the communication or information data.

In one embodiment of the inventive system, communication device 104 via programming of processor 108 constantly monitors the communication port 112 to ascertain if the voltage signal is present on line 130 without polling the first processor of the register to send over the communication data. In this embodiment, the communication device turns on when the voltage signal is present and thereafter can poll the first processor to send over the communication data.

In one embodiment of the inventive system, communication device 104 via programming of processor 108 is programed to a) wake up on a short-term schedule, b) check status of the flow, and c) decide if the communication data needs to be broadcast to the utility provider. The wake up, the check status, and the decision to broadcast comprise a monitoring sequence of the invention. In one embodiment, each monitoring sequence consumes less than 1/5,000,000th of a full charge of the first long-lifetime battery.

In one embodiment of the inventive system, either the processor 106 and/or the processor 108 is configured to detect an abnormal flow condition, for example by detecting (or determining based on internal calculations) that an amount of flow has exceeded a threshold during one or more of the set periods of time (an abnormal condition). In one alternative, processor 106 detects the threshold, and sends a wake-up signal to the communication device 104 to wake up processor 108 to start transmitting an alert to the utility provider that there is an excessive flow-type leak. In another alternative, processor 108 detects the threshold, and transmits the alert to the utility provider of the excessive flow-type leak.

In one embodiment of the inventive system, either processor 106 and/or processor 108 is configured to detect if the flow never falls below a standardized rate during one or more of the set periods of time (another abnormal condition). In one alternative, processor 106 detects the abnormal flow (that of a slow-type of leak), and sends a wake-up signal to the communication device 104 to wake up processor 108 to start transmitting an alert to the utility provider that there is abnormal flow. In another alternative, processor 108 detects the abnormal flow, and transmits the alert to the utility provider of the abnormal flow. In any of the embodiments above, the communication device 104 and the register 102 can be configured to be in a master-slave configuration with for example the register having the ability to temporarily become the master, at least to the point that the register wakes up the communication device.

In one embodiment of the inventive system, at least one of the first long-lifetime battery 114 and the second long-lifetime battery 116 provides between 1 and 20,000 milliampere-hours of current before end of life, or between 50 and 10,000 milliampere-hours of current before end of life, or between 100 and 1000 milliampere-hours of current before end of life, or between 200 and 300 milliampere-hours of current before end of life. Typically, milliampere-hour battery ratings are 19,000 milliampere-hours, 8,500 milliampere-hours, 3,600 milliampere-hours, and 2,400 milliampere-hours.

In one embodiment of the inventive system, processor 106 is programmed to provide to the communication device 104 a data communication package to be broadcast to the utility provider. The data communication package may comprise data comprising a record of the flow over one or more of the set periods of time. In this embodiment, the processor 108 can be programmed to broadcast a radio wave or bluetooth signal containing the record of the flow from the communication device.

In one embodiment of the inventive system, processor 108 of the communication device 104 is programmed to check the communication port 112 on a first programmed schedule to ascertain if the voltage signal is present on line 130. In this and other embodiments, the processor 106 of register 102 is programmed to monitor the flow on a second programmed schedule. The first programmed schedule and the second programmed schedule may comprise synchronized schedules or different schedules.

External Communication

Figure 5:
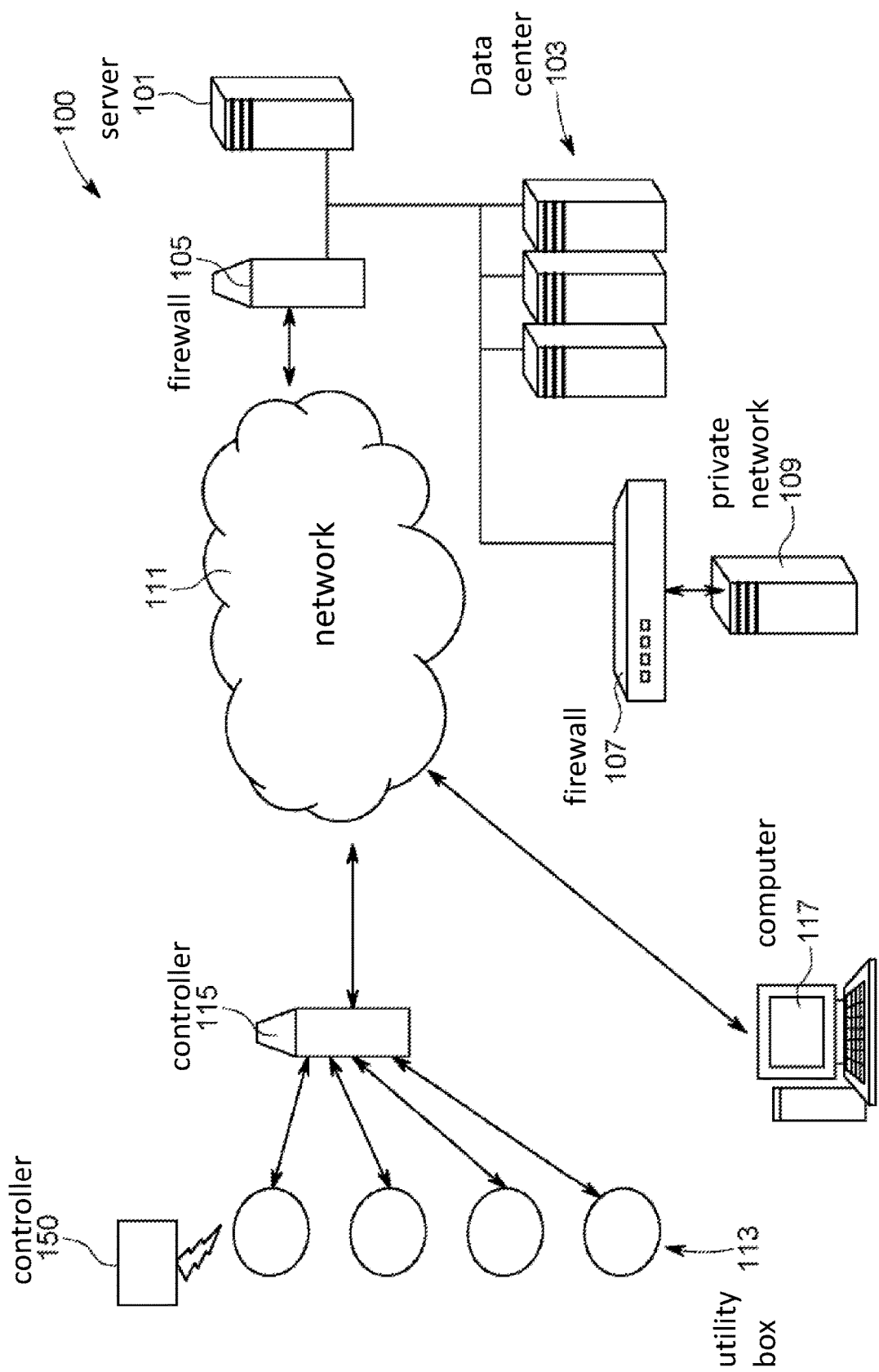
FIG. 5 is a schematic of a communication system by which communication devices connected to different the utility meters communicate to a utility provider server.

In accordance with the invention, FIG. 5 depicts a communication system 100 by which for example communication devices 34 (connected to different the utility meters 12) can communicate to a utility provider server 101 via a controller 115. Utility provider server 101 can be coupled to a data center 103 that includes databases where acquired data from the utility meters 12 or externally acquired data can be stored and optionally time-stamped.

Server 101 may be coupled via a firewall 105 to a wired or wireless network 111 which communicates to utility boxes 113 such as to the meter pits 10 described in FIG. 1. Server 101 can also be accessed via protective firewalls 107 protecting a utility company's virtual private network 109. Bi-directional communication may occur between each utility box 113 and server 101 via point of presence (POP) 115.

In addition, Internet communication devices such as personal computer 117 (or a smart phone) may access utility boxes 113 and server 101.

Controller 150 such as interrogation device 44 of FIG. 1 can interrogate processors 106 and/or 108 or a functional equivalent thereof, such as at least one application specific processor (ASP). Controller 150 (or processors 106 and 108 referenced in FIG. 4) may include one or more circuits or be a circuit that utilizes a computer readable medium, such as a memory circuit (e.g., ROM, EPROM, EEPROM, flash memory, static memory, DRAM, SDRAM, and their equivalents), configured to control the processor to perform and/or control the processes and systems of this disclosure. The computer readable medium can include the methods and algorithms discussed therein as well as data log files.

In one embodiment of the invention, instructions from controller 150 (or processors 106 and 108 referenced in FIG. 4) and information regarding alerts, alarms, and historical data can be transmitted from the meter pits 10 for communication to utility server 101 or an installer or service technicians. In a complex where there are multiple utility boxes, controller 150 may be a stationary work station monitored or monitorable by site personnel or remotely monitored by the utility provider.

Each utility box 113 is capable of monitoring the status of the meter registers in the meter pits 10. Additionally, data such as utility usage readings, or data indicative of alarm conditions deviating from the normal state (as noted above) can be taken and stored in a non-volatile memory at the box 113 or the utility server 101 or the data center 103.

Computerized Method of the Invention

Figure 6:
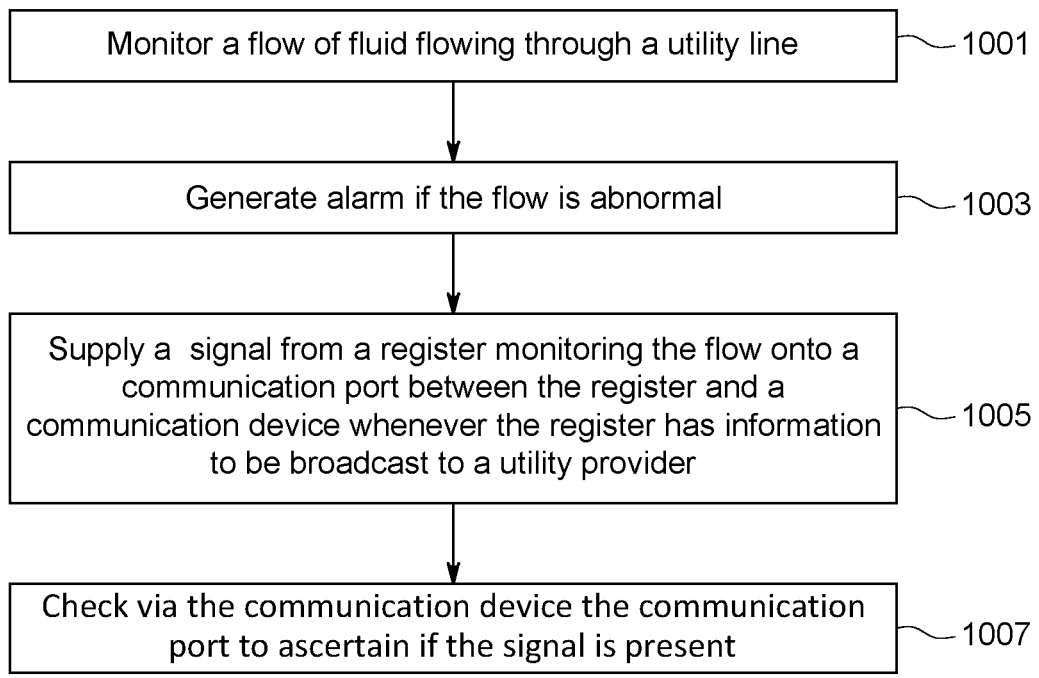
FIG. 6 is a flowchart depicting a computerized method of the invention for monitoring flow conditions for commination to a utility provider.

FIG. 6 is a flowchart depicting a computerized method of the invention for monitoring flow conditions for communication to a utility provider. The exemplary steps of this computerized method are noted therein as 1001, 1003, 1005, and 1007.

At step 1001, the method comprises monitoring a flow of fluid flowing through a utility line for example over set periods of time or continuously. At step 1003, the method comprises generating an alarm if the flow rate is abnormal. At step 1005, the method supplies (and possibly maintains) a signal (electrical or optical) on a communication port whenever the register has information (or data or alarm conditions) to be broadcast to a utility provider. At step 1007, the method checks a communication port to ascertain if the signal is present.

The computerized method can periodically check the communication port to ascertain if the signal is present. The computerized method can constantly monitor the communication port to ascertain if the signal is present.

The computerized method can generate an alarm for an abnormal flow condition such as for example an excessive flow condition or a slow flow condition when no flow was expected, either of which could be indicative of a leak or other malfunction. Other alarm conditions include (but are not limited to) conditions of a leak, a broken pipe, reverse flow, tamper, an empty pipe, a low register battery, hardware problem, bad environmental conditions, flow out of range, and/or register processor reset.

The computerized method can generate an alarm for an instrument error state.

In one embodiment, there is provided a computer program product embodied in the computer readable medium, such as a memory circuit (e.g., ROM, EPROM, EEPROM, flash memory, static memory, DRAM, SDRAM, and their equivalents (noted above) invention for monitoring flow conditions for commination to a utility provider. The computer program product contains a program which (when executed on a computer or a processor) causes the computerized method steps noted above to be executed Statements of the Invention:

The following numbered statements of the invention set forth generalized aspects of the invention.

Statement 1. A system for monitoring fluid flow for a utility provider, comprising: a register comprising a processor capable of monitoring a flow of fluid flowing through a utility line for example over set periods of time or continuously; and a communication device (e.g., a radio transceiver or other broadcaster). The communication device has a) a wake-up circuit in communication with the register via at least one communication port and b) a processor programmed and configured to communicate with the register and broadcast information from the communication device; wherein the processor of the register is programmed and configured to supply a signal (electrical or optical) on the communication port whenever the register has communication data for broadcast to the utility provider, and the wake-up circuit of the communication device checks the communication port to ascertain if the signal is present. The present invention need not have all the components noted in this statement and need not have those components in the order set forth in this statement.

Statement 2. The system of statement 1, wherein the communication device periodically checks the communication port without polling the processor of the register to send over the communication data.

Statement 3. The system of any of statements 1-2, wherein the communication device periodically checks every 1 to 15 seconds to ascertain if the signal is present.

Statement 4. The system of any of statements 1-3, wherein the communication device turns on when the voltage signal is present and then polls the processor of the register to send over the communication data.

Statement 5. The system of statement 1, wherein the processor of the communication device constantly monitors the communication port to ascertain if the signal is present without polling the processor of the register to send over the communication data.

Statement 6. The system of any of statements 1 and 5, wherein the communication device turns on when the signal is present and thereafter polls the processor of the register to send over the communication data.

Statement 7. The system of any of statements above, wherein the processor of the register is programmed to a) wake up on a short-term schedule, b) check status of the flow, and c) decide if data needs to be broadcast to the utility provider, and the wake up, the check status, and the decision to broadcast comprise a monitoring sequence.

Statement 8. The system of any of statements above, where each monitoring sequence consumes less than 1/5,000,000$^{th}$ of a full charge of a battery powering the register and the communication device.

Statement 9. The system of any of statements above, wherein the first processor of the register is configured to detect an abnormal condition, such as those described above and including (but not limited to) for example conditions indicative of a leak, a broken pipe, reverse flow, tamper, an empty pipe, a low register battery, hardware problem, bad environmental conditions, flow out of range, and/or register processor reset.

Statement 10. The system of any of statements above, wherein the first processor is programmed to detect that an amount of the flow exceeds a threshold during one or more of periods of time.

Statement 11. The system of any of statements above, wherein: when the processor of the register detects the threshold, the processor of the register sends a wake-up signal to the communication device and the communication device transmits the alert to the utility provider of the excessive flow-type leak.

Statement 12. The system of any of statements above, wherein the processor of the register is programmed to detect if the flow never falls below a standardized rate during one or more of the set periods of time.

Statement 13. The system of any of statements above, wherein: if the processor of the register detected that the flow never fell below the standardized rate, the processor of the register sends a wake-up signal to the communication device, and the communication device transmits the alert to the utility provider of the slow-type of leak.

Statement 14. The system of any of statements above, wherein the register comprises a self-powered register (e.g. having a first battery, a solar cell, or an internal generator etc.), the communication device comprises a self-powered communication device (e.g., having a second battery, a solar cell, or an internal generator in the utility box, etc.). The first battery of the register is typically sealed in a housing of the register and therefore is not replaceable. The first and second batteries are typically non-rechargeable batteries, but rechargeable batteries can be used especially if in conjunction with an internal source of power or a power coupling to an outside source of power.

Statement 15. The system of statement 14, wherein at least one of the first long-lifetime battery and the second long-lifetime battery provides between 1 and 20,000 milliampere-hours of current before end of life.

Statement 16. The system of statement 14, wherein at least one of the first battery and the second battery provides between 50 and 15,000 milliampere-hours of current before end of life.

Statement 17. The system of statement 14, wherein at least one of the first battery and the second battery provides between 100 and 1000 milliampere-hours of current before end of life. Statement 18. The system of statement 14, wherein at least one of the first battery and the second battery provides between 200 and 300 milliampere-hours of current before end of life.

Statement 19. The system of any of statements above, wherein the processor of the register is programmed to provide to the communication device a data communication package to be broadcast to the utility provider.

Statement 20. The system of any of statements above, wherein the data communication package comprises data comprising a record of the flow over one or more of the set periods of time or alarm conditions.

Statement 21. The system of any of statements above, wherein the processor of the communication device is programmed to broadcast from the communication device a radio wave signal containing the record of the flow or the alarm condition.

Statement 22. The system of any of statements above, wherein the processor of the communication device is programmed to check the communication port on a first programmed schedule to ascertain if the signal is present.

Statement 23. The system of any of statements above, wherein the processor of the register is programmed to monitor the flow on a second programmed schedule.

Statement 24. The system of any of statements above, wherein the first programmed schedule and the second programmed schedule comprise synchronized schedules.

Statement 25. The system of any of statements above, wherein the first programmed schedule and the second programmed schedule comprise different schedules.

Statement 26. A computerized method for monitoring fluid flow for a utility provider, comprising: monitoring a flow of a fluid flowing through a utility line; generating an alarm if the flow rate is abnormal; supplying a signal (electrical or optical) from a register onto a communication port between the register and a communication device whenever the register has communication data to be broadcast to a utility provider; and checking the communication port to ascertain if the signal is present. The computerized method may utilize any of the features in the system statements listed above.

Statement 27. The method of statement 26, wherein the checking comprises periodically checking the communication port to ascertain if the signal is present.

Statement 28. The method of statement 26, wherein the checking comprises constantly monitoring the communication port to ascertain if the signal is present.

Statement 29. The method of statement 26, wherein generating an alarm comprises generating an alarm for an abnormal condition.

Statement 30. The method of statement 29, wherein generating an alarm comprises generating the alarm under an excessive flow-type leak.

Statement 31. The method of statement 29, wherein generating an alarm comprises generating the alarm under a slow flow-type leak.

Statement 32. The method of statement 29, wherein generating an alarm comprises generating the alarm under an instrumental error state.

Statement 30. A computer program product having a computer readable medium which when executed on a processor permits the monitoring of fluid flow for a utility provider and implements any of the computerized method statements described above.

Numerous modifications and variations of the present invention are possible in light of the above teachings. It is therefore to be understood that within the scope of the appended claims, the invention may be practiced otherwise than as specifically described herein.

The invention claimed is:

1. A system for monitoring a flow of a fluid for a utility provider, comprising:
   a register comprising a processor capable of monitoring the flow of the fluid flowing to a structure having a utility line therein; and
   a communication transceiver disposed with the structure and having:
   a) a wake-up circuit in communication with the register via at least one communication port and
   b) a processor programmed and configured to communicate with the register and broadcast information from the communication transceiver;
   wherein
   the processor of the register is programmed and configured to supply a signal on the at least one communication port whenever the register has communication data for broadcast to the utility provider,
   the wake-up circuit of the communication transceiver checks the at least one communication port to ascertain if the signal from the register is present,
   the communication transceiver and the register are attached to the structure,
   for the communication transceiver in communication with the register and attached to the structure having the utility line therein to wake-up, the communication transceiver checks the at least one communication port in communication with the register for the signal from the register that the register has the communication data for broadcast to the utility provider, the processor of the communication transceiver monitors the at least one communication port to ascertain if the signal is present, and the communication transceiver turns on when the signal is present and thereafter polls the processor of the register to send over the communication data for broadcast to the utility provider.

2. The system of claim 1, wherein the communication transceiver periodically checks the at least one communication port without polling the processor of the register to send over the communication data for broadcast to the utility provider.

3. The system of claim 2, wherein the communication transceiver periodically checks every 1 to 15 seconds to ascertain if the signal is present.

4. The system of claim 1, wherein the processor of the register is programmed to a) a wake up of the processor of the register, b) a check status of the flow of the fluid, and c) decide if the communication data for broadcast to the utility provider needs to be broadcast to the utility provider, and
the wake up of the processor of the register, the check status, and the decision to broadcast comprise a monitoring sequence.

5. The system of claim 4, wherein the monitoring sequence consumes less than 1/5,000,000th of a full charge of a battery powering the register and the communication transceiver.

6. The system of claim 1, wherein the processor of the register is configured to detect an abnormal condition.

7. The system of claim 6, wherein the processor of the register is programmed to detect that an amount of the flow of the fluid exceeds a threshold during one or more of periods of time.

8. The system of claim 7, wherein:
when the processor of the register detects the threshold, the processor of the register sends a wake-up signal to the communication transceiver; and
the communication transceiver transmits an alert to the utility provider of the flow of the fluid exceeding the threshold.

9. The system of claim 7, wherein the processor of the register is programmed to detect if the flow of the fluid never falls below a standardized rate during the one or more of the periods of time.

10. The system of claim 9, wherein:
if the processor of the register detected that the flow of the fluid never fell below the standardized rate, the processor of the register sends a wake-up signal to the communication transceiver; and
the communication transceiver transmits an alert to the utility provider of a slow-type of leak.

11. The system of claim 1, wherein at least one of:
the register comprises a self-powered register, and
the communication transceiver comprises a self-powered communication transceiver.

12. The system of claim 11, wherein at least one of the self-powered register and the self-powered communication transceiver comprise at least one of a first long-lifetime battery and a second long-lifetime battery, the first and second long-lifetime batteries providing between 1 and 20000 milliampere-hours of current before end of life.

13. The system of claim 1, wherein the processor of the register is programmed to provide to the communication transceiver a data communication package to be broadcast to the utility provider.

14. The system of claim 13, wherein the data communication package comprises data comprising a record of the flow of the fluid over one or more periods of time.

15. The system of claim 14, wherein the processor of the communication transceiver is programmed to broadcast from the communication transceiver a radio wave signal containing the record of the flow of the fluid or an alarm condition.

16. The system of claim 1, wherein the processor of the communication transceiver is programmed to check the at least one communication port on a first programmed schedule to ascertain if the signal is present.

17. The system of claim 1, wherein the register is physically connected to the communication transceiver.

18. The system of claim 1, wherein the register is connected to the communication transceiver by a line which carries electrical or optical signals in between the register and the communication transceiver.

19. The system of claim 1, wherein the register is coupled to the communication transceiver and conveys the information in between by electrical or optical signals.

20. The system of claim 1, wherein the communication transceiver is run
a) in a first power state or
b) in a second power state continuously run at a lower power than the first power state, and
upon detection of the signal from the register by the wake-up circuit, the communication transceiver powers up to the first power state for obtaining and broadcast of the information therefrom.

21. A computerized method for monitoring a flow of fluid for a utility provider, comprising:
monitoring the flow of the fluid flowing through a utility line to a structure;
generating an alarm if the flow of the fluid is abnormal;
supplying a signal from a register monitoring the flow of the fluid onto a communication port between the register and a communication transceiver in communication with the register and disposed with the structure whenever the register has communication data for broadcast to the utility provider;
for the communication transceiver in communication with the register and disposed with the structure having the flow of the fluid flowing thereto to wake-up, checking via the communication transceiver and having a wake-up circuit, the communication port in communication with the register to ascertain if the signal from the register, that the register has the communication data for broadcast to the utility provider, is present,
wherein
the communication transceiver monitors the communication port to ascertain if the signal is present, and
the communication transceiver turns on when the signal is present and thereafter polls the register to send over the communication data for broadcast to the utility provider.

22. A system for monitoring a flow of fluid for a utility provider, comprising:
a register comprising a processor capable of monitoring the flow of the fluid flowing through a utility line to a structure; and
a communication transceiver disposed with the structure and having:

a) a wake-up circuit in communication with the register via at least one communication port and
b) a processor programmed and configured to communicate with the register and broadcast information from the communication transceiver;

wherein the processor of the register is programmed and configured to supply a signal on the at least one communication port whenever the register has communication data for broadcast to the utility provider, and the wake-up circuit of the communication transceiver checks the at least one communication port to ascertain if the signal from the register is present, the register is physically connected to the communication transceiver, for the communication transceiver in communication with the register and physically connected to the register to wake-up, the communication transceiver checks the at least one communication port in communication with the register for the signal from the register that the register has the communication data for broadcast to the utility provider, the processor of the communication transceiver monitors the at least one communication port to ascertain if the signal is present, and the communication transceiver turns on when the signal is present and thereafter polls the processor of the register to send over the communication data for broadcast to the utility provider.

\* \* \* \* \*